United States Patent [19]

Porter

[11] 4,125,011
[45] Nov. 14, 1978

[54] ELECTRICALLY CALIBRATED AIR GAUGING APPARATUS

[75] Inventor: David E. Porter, Alameda, Calif.

[73] Assignee: PSW Associates, Hayward, Calif.

[21] Appl. No.: 873,121

[22] Filed: Jan. 30, 1978

[51] Int. Cl.² .............................................. G01L 27/00
[52] U.S. Cl. ...................................... 73/4 R; 73/37.9
[58] Field of Search ............... 73/4 R, 1 R, 1 J, 37.9, 73/37.5, 432 A

[56] References Cited

U.S. PATENT DOCUMENTS

| 2,457,401 | 12/1948 | Rupley | 73/37.9 |
| 2,862,178 | 11/1958 | Moore | 73/1 J X |

*Primary Examiner*—S. Clement Swisher
*Assistant Examiner*—Joseph W. Roskos
*Attorney, Agent, or Firm*—Blakely, Sokoloff, Taylor & Zafman

[57] ABSTRACT

An electrically calibrated air gauging apparatus for measuring or comparing dimensions is disclosed. The apparatus is calibrated with only electrical adjustments and does not require the difficult pneumatic adjustments associated with prior devices. A monolithic, semiconductor pressure transducer is employed to sense the air pressure in the probe line. The apparatus includes a linear mode which provides an extended range of display readings proportional to the deviation of an unknown dimension from a known dimension.

13 Claims, 3 Drawing Figures

ELECTRICALLY CALIBRATED AIR GAUGING APPARATUS

BACKGROUND OF THE INVENTION

1. Field of the Invention

The invention relates to the field of pneumatic gauging devices.

2. Prior Art

Pneumatic gauging devices for measuring dimensions are well-known in the art. These devices are used for precision inspection of both inside and outside dimensions. They are most popularly used, however, to inspect internal dimensions such as bores. Most often these devices include a probe having a plurality of fixed orifices (hereinafter a "bore" shall be used for purposes of explanation). The probe is inserted into a workpiece having an unknown internal dimension. The air flow through or back pressure created by the probe is noted. This flow is compared to the flow or pressure created by a bore of known dimension to provide an indication of the deviation of the unknown bore from the known bore. Most often two or more known bores (hereinafter referred to as "standards") are first used to calibrate the apparatus. Prior art pneumatic gauging devices are shown in U.S. Pat. Nos. 2,749,742 and 2,755,659.

It is difficult to calibrate prior art air gauging devices. In fact, it takes a relatively skilled technician to calibrate such devices; once calibrated a lower degree of skill is required to use the devices. The primary reason for the difficulty in calibrating such devices is that pneumatic adjustments are used for calibration. Typically, a number of flow or pressure control adjustments (such as with valves) are used to calibrate the devices. Adjusting one valve frequently requires the readjustment of another valve. Thus, these devices require adjusting and readjusting the same valves, in a trial and error manner, until calibration is achieved.

With the present invention the pneumatic circuit remains fixed and calibration is accomplished in a straight-forward manner with electrical adjustments. This greatly simplifies the calibration procedure and provides a more stable instrument. It allows optimization of the pneumatic components. Also, it permits a wide variation of probe designs to be calibrated for measurement. In the prior art, only probes designed especially for a given instrument could be used.

For the most part, fluid driven gauges are used in the prior art gauging apparatuses. In one instance an electrically driven meter movement is employed for a display. The meter is driven from a differential pressure transformer. However, pneumatic adjustments are still employed for calibration.

SUMMARY OF THE INVENTION

An electrically calibrated fluid gauging apparatus is disclosed. The apparatus includes a line for coupling to a source of fluid such as air. An ordinary gauging probe is employed and is coupled to receive regulated fluid from the source line. A monolithic, semiconductor pressure transducer is coupled to the probe line to sense the pressure of the fluid flowing in this line. The electrical signals from this transducer are employed to drive a meter or other display through an electrical circuit. This electrical circit includes means for making a first electrical adjustment when the probe engages a first standard, and a second electrical adjustment when the probe engages a second standard. These two adjustments are the only adjustments required to calibrate the apparatus. In one mode of operation, amplifiers having a generally logarithmic characteristic are employed to extend the linear range of the display readings.

DETAILED DESCRIPTION OF THE INVENTION

An electrically calibrated fluid gauging apparatus suitable for determining dimensions such as the diameters of bores, shafts, etc., is described. In the following description, numerous specific details of the apparatus, such as specific pressures, etc., are given in order to provide a thorough understanding of the invention. It will be obvious to one skilled in the art that the invention may be practiced, however, without employing these specific details. In other instances, well-known means such as amplifiers have been shown in block diagram form in order not to obscure the present invention in unnecessary detail.

Figure 1:
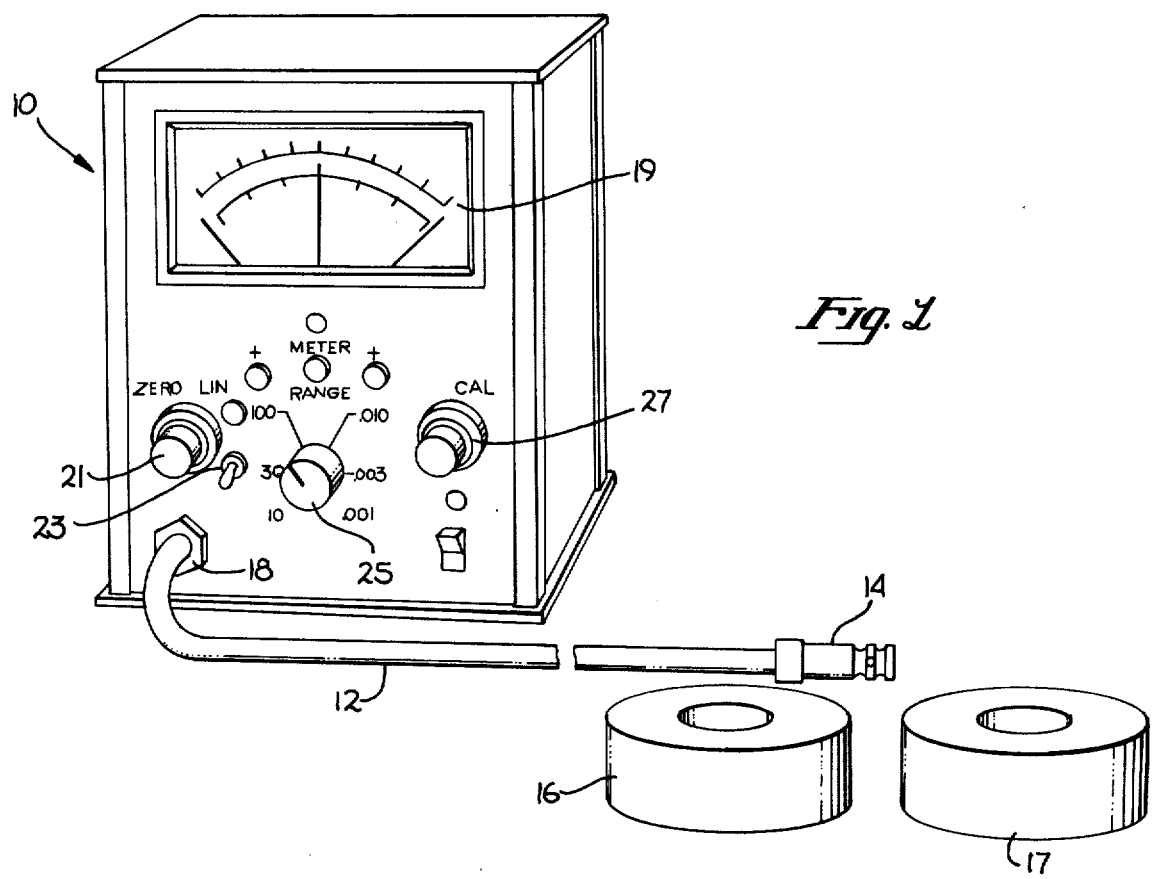
FIG. 1 is a perspective view of the apparatus including a probe and two standards.

Referring first to FIG. 1, the electrical circuit of the apparatus and a substantial part of the pneumatic circuit is housed within the cabinet 10. The front panel of the cabinet 10 includes the controls and a display means, specifically an electrical meter 19. Other display means such as a digital display may be employed in lieu of the meter 19. The pertinent controls for the apparatus included on the front panel of the cabinet 10 include a zero setting control (potentiometer) 21 and a calibration adjustment (potentiometer) 27. A switch 23 allows the selection of either a linear mode or a normal mode. A switch 25 is employed to select a meter range. A fluid connector 18 on the front panel 10 cooperatively engages a probe line 12. The other end of the probe line 12 is coupled to a probe 14.

Also illustrated in FIG. 1 are a pair of standards (bores) 16 and 17. The use of these standards shall be discussed in conjunction with FIG. 3.

Figure 2:
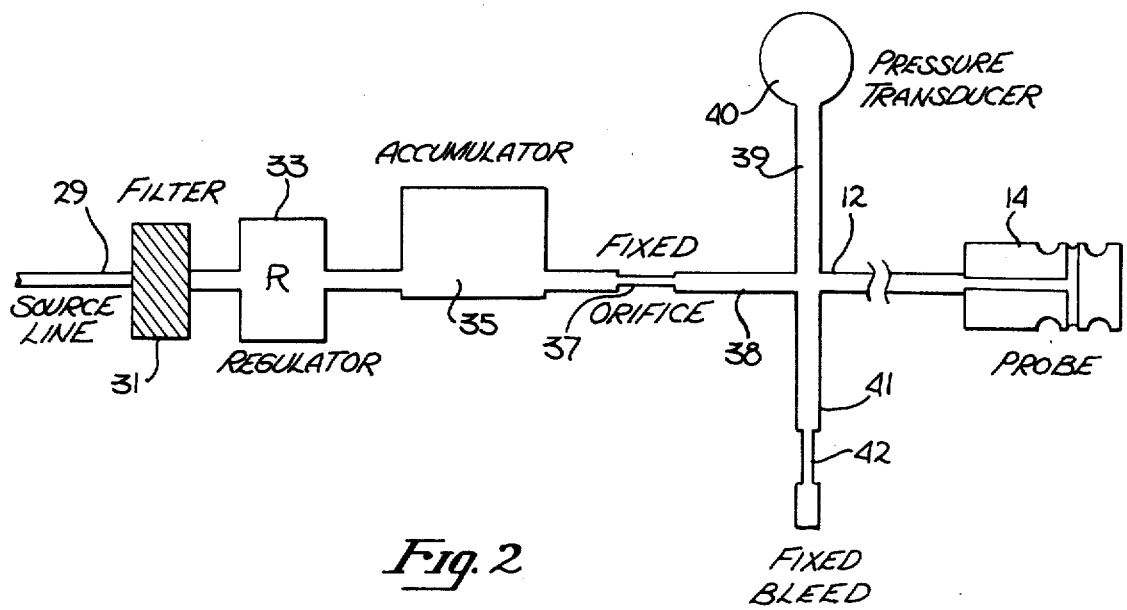
FIG. 2 is a block diagram of the pneumatic circuit employed in the apparatus of FIG. 1.

Referring to the schematic of FIG. 2, the apparatus of FIG. 1 is coupled to a source of fluid through a connector located on the rear panel of the cabinet. This adapter communicates with the source line 29 of FIG. 2. In the presently preferred embodiment, the source line 29 is coupled to a 50psi (minimum) air source, however, other fluids such as nitrogen may be used. Line 29 is coupled through a filter 31 to a regulator 33. The regulator 33 provides regulated air at 40psi, in the presently preferred embodiment. The output of the regulator 33 is coupled to a dead volume or accumulator 35. In the presently preferred embodiment, this accumulator has a volume of approximately 20 cubic inches. The output of the accumulator 35 is coupled to a fixed orifice 37; this orifice is a bell-shaped momentum orifice in the presently preferred embodiment. Orifice 37 is connected through line 38 to lines 39 and 41, and to the probe line 12. The line 41 terminates in a fixed bleed 42. This bleed is a fixed linear mass flow resistor which provides compensation for the normal non-linearity in the pneumatic circuit and which extends the linear measuring range of the pneumatic circuit. The line 39 terminates in the pressure transducer 40. This transducer as will be explaind in greater detail in conjunction with FIG. 3, senses the air pressure of the air delivered to the probe 14. The line 12 as previously discussed in conjunction with FIG. 1 terminates in the probe 14.

As is apparent from FIG. 2, when the source line 29 receives air, a regulated source of air is provided to the probe 14 through line 12. Note that in FIG. 2 there are no pneumatic adjustments which need to be made in the normal operation and calibration of the apparatus. The accumulator 35 has been found to assist in providing excellent flow.

Figure 3:
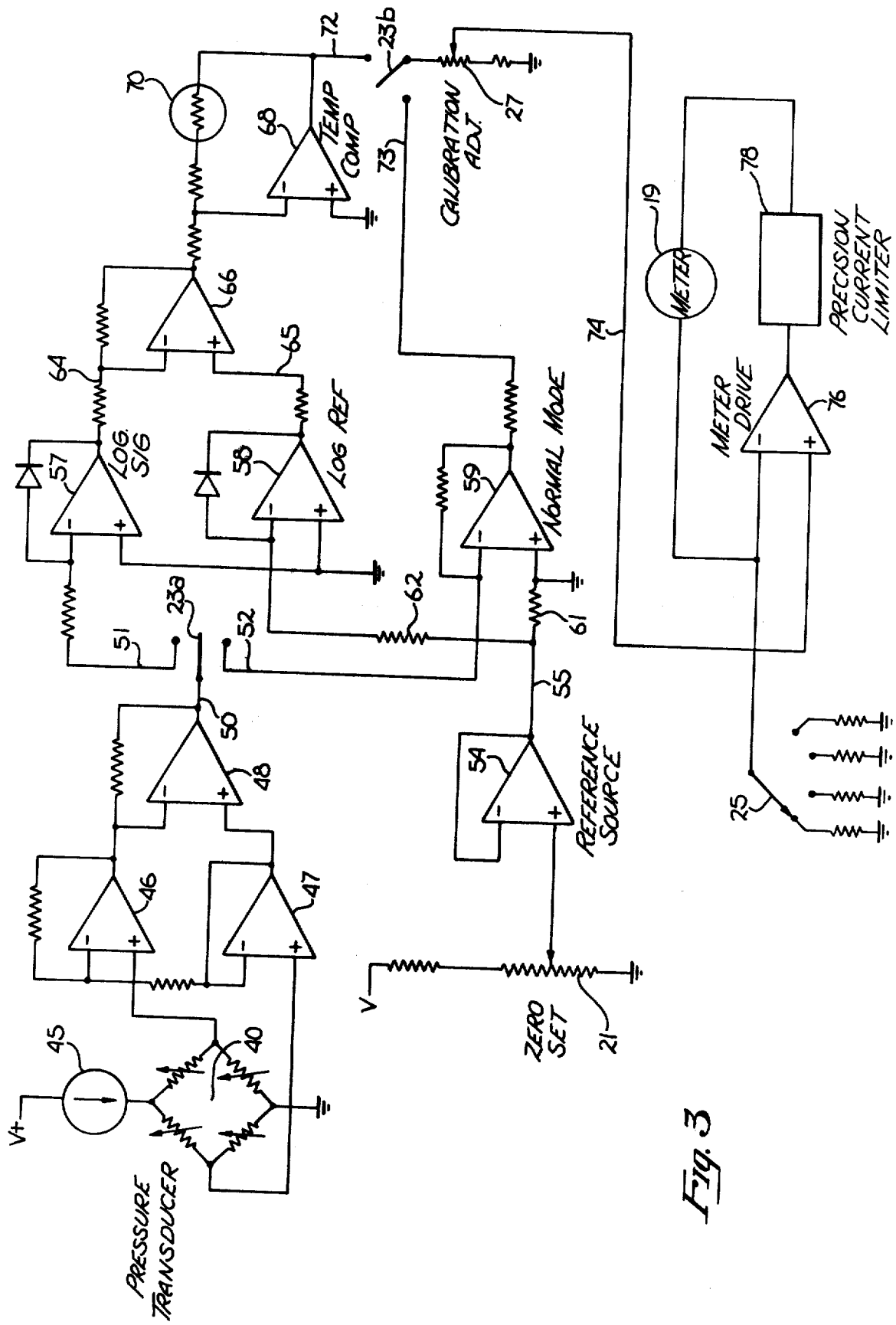
FIG. 3 is an electrical schematic of the presently preferred circuit employed in the apparatus of FIG. 1.

The electrical or electronic portion of the apparatus of FIG. 1 is shown in FIG. 3 and includes the pressure transducer 40 of FIG. 2. In the presently preferred embodiment, this commercially available pressure transducer comprises a monolithic, semiconductor device fabricated on a silicon substrate (diaphragm). The transducer operates on the strain gauge principle. The strain gauge material is defined by doped regions in the substrate. The silicon diaphragm as implemented deflects only approximately 0.0005 inches at maximum pressure. This small displacement assures linearity and reduces errors due to hysteresis losses. The transducer may be represented by a Wheatstone bridge as shown in FIG. 3. The branches of this bridge circuit are shown as variable resistors to indicate that the resistance in the bridge varies as a function of displacement (pressure). The pressure transducer includes temperature compensation circuits which may be external or integrated into the diaphragm. Other similar semiconductor devices may be employed including those where the strain gauge material is sputtered onto a silicon substrate or insulated from the substrate by an insulative layer. It is also obvious that other types of pressure sensing transducers can be used, such as piezoelectric transducers.

One terminal of the pressure transducer 40 is coupled to a constant current source 45 which provides a constant current of approximately 2.5 milliamps in the presently preferred embodiment. The opposite node of the bridge circuit is coupled to ground. The two remaining nodes of the bridge circuit are coupled to the positive input terminals of the operational amplifiers 46 and 47. The outputs of the amplifiers 46 and 47 are connected to the negative and positive terminals, respectively, of an operational amplifier 48 to provide a differenced signal on line 50 which is substantially proportional to sensed pressure. The operational amplifiers 46, 47 and 48 all employ negative feedback as shown.

The switch 23 of FIG. 1 is shown in FIG. 3 as a double-pole, double-throw switch having arms 23a and 23b. The arm 23a allow the line 50 to be coupled to either line 51 or the line 52. As will be explained in greater detail, when line 50 is coupled to line 51, an extended linear mode is selected; when line 50 is coupled to line 52, the normal mode is selected.

A reference signal which is used by both the amplifiers 58 and 59 is generated by a reference source which comprises the operational amplifier 54. The positive terminal of the amplifier 54 is connected to the wiper arm of potentiometer 21. Note that the potentiometer 21 is shown in FIG. 1; the "zero adjustment" made this potentiometer is one of the two electrical adjustments required to calibrate the apparatus. The output of the amplifier 54 is coupled by line 55 to the positive terminal of the amplifier 59 through resistor 61, and to the negative terminal of the amplifier 58 through the resistor 62.

The signal path for the normal mode includes the operational amplifier 59 which receives the signal on line 52 at its negative input terminal. The output of this amplifier is coupled through a resistor to line 73. The arm 23b allow line 73 to be connected to line 74 (through potentiometer 27) simultaneously when line 50 is connected to line 52.

The signal path for the extended linear mode includes the amplifiers 57 and 58. These amplifiers have a logarithmic characteristics. Line 51 is coupled to the negative input terminal of the amplifier 57 through a resistor. As previously mentioned, the reference signal is coupled to the negative input terminal of the amplifier 58 through resistor 62. The positive input terminals of both these amplifiers are coupled to ground. The output of the amplifier 57 is connected through a resistor to line 64; this line is connected to the negative input terminal of an operational amplifier 66. Similarly, the output of the amplifier 57 is coupled through a resistor to line 65; this line is connected to the positive terminal of the amplifier 66. The output of the amplifier 66 is connected through a resistor to the negative input terminal of an operational amplifier 68. The positive terminal of this amplifier is coupled to ground; the output of this amplifier is coupled to line 72. Line 72 may be connected to the line 74 through the potentiometer 27 by arm 23b simultaneously when line 50 is connected to line 51. The amplifier 68 includes negative feedback through a pair of resistors, one of which is a temperature sensitive resistor 70. This temperature sensitive resistor provides temperature varying feedback and thereby provides temperature compensation in the signal path.

The potentiometer 27 is also shown in FIG. 1, this device providing the calibration adjustment or second electrical adjustment required to calibrate the apparatus.

A meter driving circuit to drive the meter 19 includes an operational amplifier 76 and a precision current limiter 78. The current limiter 78 and meter 19 are coupled in series between the output of amplifier 76 and the negative input terminal of this amplifier. Line 74 which provides the input signal to the amplifier is coupled to the positive input terminal of the amplifier 76. The negative input terminal of this amplifier is also coupled to ground through one of a plurality of resistors through the range selecting switch 25; this switch is also shown in FIG. 1.

The current limiter 78 is employed to prevent high currents which may damage the meter. This is most likely to occur when the probe is not engaging a bore. This limiter, in the presently preferred embodiment, employs diode clippers which are set to limit meter current to 5 to 10 percent beyond that required for full scale deflection. Thus, the limiter does not affect full scale readings.

Referring now to FIGS. 1 and 3, assume standard 16 includes a 1 inch diameter bore and that standard 17 includes a 1.001 inch diameter bore and the selected fullscale reading is ±1.001 inch. To calibrate the apparatus assuming air is flowing through the probe 14, the probe 14 is first inserted into the standard 16. The zero adjustment is then made with the potentiometer 21 to bring the meter reading to the center of the scale. Then the probe 14 is inserted into the standard 17 and the calibration adjustment (potentiometer 27) is adjusted to give a calibrated full scale reading. This operation completes the calibration of the circuit. Sometimes, however, it is desirable to shift the calibrated scale reading up or down scale to line up with convenient "target" numbers. Since the first electrical adjustment provides level shifting and it is independent of the second adjustment, it may be used to shift the calibrated scale to the desired location. Once this is completed, the probe 14 may then be used in an ordinary manner to detect the dimensions of bores.

Referring more specificaly to FIG. 3, assume that the arms 23a and 23b are selecting the normal mode, that is, line 50 is coupled to line 52, and line 73 is coupled to line 74. The amplifiers 46 and 47 provide an ordinary preconditioning or preamplification function and amplify the signals received directly from the pressure transducer 40. The signal changes from the transducer applied to amplifiers 46 and 47 effectively are opposite in polarity and thus are differenced within the amplifier 48. The signal changes on line 50 are substantially proportional to the pressure changes in the probe line.

During the zero adjustment, the amplifier 59 senses the signals on line 52 which result from the first standard. This signal is compared in amplifier 59 with the signal provided from the reference source means. The potentiometer 21 is adjusted until the meter 19 is zeroed.

When the probe is inserted into the second standard, a different pressure is sensed and hence the signal on line 50 changes. This causes the meter 19 to be deflected. By adjusting the potentiometer 27, a calibrated fullscale deflection is obtained. Note that if the second standard results in a larger signal on line 73, the fullscale adjustment with potentiometer 27 is made so as to provide a fullscale deflection in one direction, whereas if the signal on line 73 is smaller when the second standard is employed, a full deflection in the opposite direction is obtained.

The mathematical expressions relating the measured pressure to the measured dimension for cascaded orifice (back pressure) pneumatic amplifiers are highly non-linear and can not be generally solved with simple closed form equations. Simplified mathematical expressions providing good approximation to observed behavior are well-known to those practicing the arts of applied mathematics or fluid mechanics. A good approximation can be achieved by expressing a dimensional ratio in terms of a pressure ratio raised to a power (this approximation is particularly attractive as will be seen later).

The prior art restricts the region of measurement to a narrow segment of the total measuring range so that the errors due to non-linearity are kept small.

In the presently preferred embodiment, the fixed linear mass flow resistor 42 provides a significant degree of compensation for this non-linearity. This type of compensation was unknown in the prior art because it can only be properly accomplished with a fixed pneumatic circuit. This type of compensation can only be optimized for probes having orifice diameters within a certain range. The improvement does not adversely affect the performance under non-optimum conditions, however.

When linearity between the measured dimensions and the meter readings is desired, over a more extended range, the switch 33 of FIG. 1 is moved to the linear position coupling line 50 to line 51 and line 72 to line 74. Again, the probe is inserted in the first standard and the potentiometer 21 is adjusted to center or zero the meter 19. The reference signal on line 55 is coupled to the amplifier 58, which amplifier provides a reference signal for amplifier 66. The signal from the transducer is coupled through line 51 to the amplifier 57 and compared with the reference signal on line 65 within the amplifier 66. In a similar manner to the normal mode, when the probe is inserted into the second standard, the potentiometer 27 is adjusted to provide the fullscale reading on the meter 19.

As previously mentioned, amplifiers 57 and 58 have logarithmic characteristics. The outputs of these amplifiers are differenced by the amplifier 66. The effect of differencing logarithmic functions is the equivalent of a division. As mentioned, with cascaded orifices the pressures can be conveniently expressed in terms of a ratio raised to a power. By differencing the logarithmic signals, the ratios in these equations are duplicated. This results in increased linearity and the power dependence (non-linear) becomes a simple multiplier (linear) between the signal at the output of the amplifier 66 and the measured dimension. For the linear mode, temperature compensation is provided by the amplifier 68 as previously discussed.

Thus, an electrically calibrated pneumatic gauging apparatus has been described which is calibrated in a staight-forward manner with two electrical adjustments. No pneumatic adjustments are required to calibrate the apparatus. Typical accuracies of 0.000005 inches are obtained with the apparatus even with a relatively unskilled operator.

I claim:

1. A fluid gauging apparatus comprising:
   a source line for coupling to a source of fluid;
   a probe coupled to said source line for receiving at least a portion of the fluid flowing in said source line;
   a monolithic pressure transducer coupled to sense the pressure of fluid flowing to said probe;
   reading means for providing a reading;
   electrical means coupled to said transducer and said reading means for driving said reading means in response to said pressure sensed by said transducer;
   said electrical means including a first and second electrical adjustment for allowing a first electrical adjustment when said probe engages a first standard and a second electrical adjustment when said probe engages a second standard, said electrical adjustments to permit calibration of said apparatus;
   whereby said apparatus is calibrated without fluid adjustments.

2. The apparatus defined by claim 1 wherein said pressure transducer comprises a semiconductor device.

3. The apparatus defined by claim 2 wherein said reading means comprises a meter, said first adjustment zeros said meter and said second adjustment provides a calibrated full-scale reading on said meter.

4. The apparatus defined by claim 2 wherein said electrical means includes a first operational amplifier and wherein said first electrical adjustment provides a reference signal for said first operational amplifier.

5. The apparatus defined by claim 4 wherein said electrical means includes a first mode of operation which provides readings on said reading means which are proportional to said pressure sensed by said transducer and a second mode where said readings are non-linear with respect to said sensed pressure.

6. The apparatus defined by claim 5 wherein said electrical means includes a first logarithmic amplifier and a second logarithmic amplifier and means for differencing the outputs from said first and second logarithmic amplifiers, said logarithmic amplifiers being employed during said second mode.

7. The apparatus defined by claim 1 including a accumulator coupled within said source line.

8. The apparatus defined by claim 1 including bleed means in said source line for providing a continuous fluid bleed.

9. The apparatus defined by claim 8 wherein bleed means comprises a fixed linear mass flow resistor.

10. An air gauging apparatus comprising:
   a source line for coupling to a source of air;
   regulation means for providing regulated air coupled from said source line;
   a probe coupled to receive air from said regulation means;
   a monolithic semiconductor pressure transducer coupled to sense the pressure of air delivered to said probe;
   display means for providing a visual display;
   display driving means coupled to said display for driving said display;
   electrical means coupled to said transducer and to said display driving means, said electrical means comprising:
      reference signal means for providing a reference signal;
      comparison means for comparing two electrical signals, said comparison means coupled to receive said reference signal and coupled to said transducer;
      said reference signal means including a first adjustment means for adjusting said display means to a first display when said probe engages a first standard;
      second adjustment means coupled to said comparison means, said second adjustment means for adjusting said display means to a second display when said probe engages a second standard;
   whereby said apparatus is calibrated without adjusting the flow of air to said probe.

11. The apparatus defined by claim 10 wherein said display means is a meter, said first display is a zero reading and said second display is a calibrated scale reading.

12. The apparatus defined by claim 10 wherein said comparison means includes a first logarithmic amplifier for receiving said reference signal and a second logarithmic amplifier coupled to said transducer, and a differencing means for providing a signal representative of the difference of the outputs from said first and second logarithmic amplifiers.

13. The apparatus defined by claim 12 wherein said comparison means includes an additional amplifier coupled to receive said reference signal and coupled to said transducer, and switching means for allowing said first and second logarithmic amplifiers and said differencing means to be coupled to said display driving means or said additional amplifier to be coupled to said display driving means.

* * * * *